(12) United States Patent
Morreale et al.

(10) Patent No.: US 11,274,676 B2
(45) Date of Patent: Mar. 15, 2022

(54) FAN MODULE WITH VARIABLE-PITCH BLADES FOR A TURBINE ENGINE

(71) Applicant: SAFRAN AIRCRAFT ENGINES, Paris (FR)

(72) Inventors: Serge René Morreale, Moissy-Cramayel (FR); Yanis Benslama, Moissy-Cramayel (FR); Jérémy Dievart, Moissy-Cramayel (FR); Dominik Igel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 136 days.

(21) Appl. No.: 16/067,744

(22) PCT Filed: Dec. 22, 2016

(86) PCT No.: PCT/FR2016/053654
§ 371 (c)(1),
(2) Date: Jul. 2, 2018

(87) PCT Pub. No.: WO2017/118794
PCT Pub. Date: Jul. 13, 2017

(65) Prior Publication Data
US 2019/0024672 A1 Jan. 24, 2019

(30) Foreign Application Priority Data
Jan. 5, 2016 (FR) ........................................ 1650026

(51) Int. Cl.
*F04D 29/36* (2006.01)
*F01D 7/00* (2006.01)
(Continued)

(52) U.S. Cl.
CPC .......... *F04D 29/362* (2013.01); *B64C 11/385* (2013.01); *F01D 7/00* (2013.01);
(Continued)

(58) Field of Classification Search
CPC ..... F01D 1/24; F01D 1/26; F01D 7/00; F01D 25/16; F04D 29/056; F04D 29/059;
(Continued)

(56) References Cited

U.S. PATENT DOCUMENTS 4,704,862 A * 11/1987 Dennison .................. F02C 7/36
60/226.2
5,941,683 A * 8/1999 Ridyard ................ F01D 25/162
415/142

(Continued)

FOREIGN PATENT DOCUMENTS

FR        2980770 A1    4/2013
GB         773065 A     4/1957

OTHER PUBLICATIONS

Print-out of https://s2.smu.edu/propulsion/Pages/variations.htm (Year: 2009).*

(Continued)

*Primary Examiner* — Christopher R Legendre
(74) *Attorney, Agent, or Firm* — Christensen O'Connor Johnson Kindness PLLC

(57) ABSTRACT

A ducted fan module with variable-pitch blades for a turbo engine includes a rotor carrying a plurality of blades, a stationary casing, and a blade pitch changing and control system. The rotor includes a central shaft and a surrounding blade support ring. A front end of the blade support ring is connected to a front end of the central shaft, creating a rearward-opening annular space between the blade support ring and the central shaft. A tubular part is connected to the stationary casing and extends into the annular space.

11 Claims, 4 Drawing Sheets

(51) Int. Cl.
  *F04D 29/059* (2006.01)
  *B64C 11/38* (2006.01)
  *F04D 29/32* (2006.01)
  *F04D 29/056* (2006.01)
  *F01D 25/16* (2006.01)
  *F02K 3/06* (2006.01)

(52) U.S. Cl.
  CPC ............... *F01D 25/16* (2013.01); *F02K 3/06* (2013.01); *F04D 29/056* (2013.01); *F04D 29/059* (2013.01); *F04D 29/323* (2013.01); *F04D 29/325* (2013.01); *F05D 2220/36* (2013.01); *F05D 2260/79* (2013.01); *F05D 2270/64* (2013.01); *Y02T 50/60* (2013.01)

(58) Field of Classification Search
  CPC .... F04D 29/325; F04D 29/362; F04D 29/323; B64C 11/30–44; F05D 2220/36; F05D 2260/79; F05D 2270/64; F02K 3/06
  See application file for complete search history.

(56) References Cited

U.S. PATENT DOCUMENTS

| | | |
|---|---|---|
| 2014/0205457 A1 | 7/2014 | Curlier et al. |
| 2014/0294585 A1 | 10/2014 | Escure et al. |
| 2019/0024672 A1* | 1/2019 | Morreale ................ F01D 25/16 |

OTHER PUBLICATIONS

English Translation of Written Opinion dated Apr. 13, 2017, issued in corresponding International Application No. PCT/FR2016/053654, filed Jan. 5, 2016, 6 pages.

International Search Report dated Apr. 13, 2017, issued in corresponding International Application No. PCT/FR2016/053654, filed Dec. 22, 2016, 2 pages.

Written Opinion of the International Searching Authority dated Apr. 13, 2017, issued in corresponding International Application No. PCT/FR2016/053654, filed Dec. 22, 2016, 6 pages.

* cited by examiner

FAN MODULE WITH VARIABLE-PITCH BLADES FOR A TURBINE ENGINE

FIELD OF THE INVENTION

The invention relates to a turbo-engine fan with variable-pitch blades. More specifically, it involves holding the rotor of this fan.

PRIOR ART

The variable pitch of a turbo-engine fan is a means of boosting performance in various flight conditions. Additionally, the variable pitch may be advantageous in placing the blades in a feathered position, i.e. where they do not exert any thrust on the air even as the fan rotates, and then in a position where the thrust of the fan is reversed, without changing its rotation direction. The feathered position is a middle position of the blade pitch angle between the propulsion and reverse thrust modes.

The following documents are known to have been presented by the applicant requesting the variable-pitch blades: FR-B1-3009710, US-A1-2014/0205457 and FR-A1-2980770. The blades are pivotally mounted around radial axes on a fan rotor support ring. The blade pitch changing and control devices include a system of rods that can control the blade rotation by acting on conical pivot torques or on link rods, for instance. The movement of the rods can be driven by a hydraulic cylinder.

However, in the aforementioned documents, the pitch changing and control devices are related to open rotors that have a high hub-to-tip ratio and lack rigidity during rotation of the rotor. With respect to the hub-to-tip ratio, each fan blade is linked to a radial shaft by the blade foot, which is connected to a link rod, for instance. The middle radial shaft influences the size of the hub and the overall external dimensions. As concerns rigidity, the blade pitch changing and control devices come with mechanisms that have specific overall external dimensions and a specific mass. This makes it more difficult to hold the rotating fan rotor in the turbo engine casing. Additionally, variable-pitch systems may not function properly if the fan rotor is not held in a sufficiently rigid position, where such systems contain connections between parts of different diameters, or stator and rotor parts.

Therefore, there is a need to design fan modules with variable-pitch blades that can secure the rotor in a sufficiently rigid position, while reducing the hub-to-tip ratio.

PRESENTATION OF THE INVENTION

The invention relates to a ducted fan module with variable-pitch blades for a turbo engine, including a rotor carrying blades, a stationary casing and a pitch changing and control system for adjusting and controlling the setting of the blades, the rotor comprising a central shaft and a blade support ring surrounding the shaft, a front end of the ring that is connected to a front end of the shaft, so as to create a rearward-opening annular space between the ring and the shaft, said annular space of the rotor casing the said system and the shaft being guided by a first bearing mounted in the stationary casing behind the ring, the support ring accommodating shafts forming the feet of each blade, the module containing a tubular part connected to the stationary casing and extending into the said annular space in front of the first bearing, the tubular part carrying at least a first complementary bearing for guiding the shaft.

In the document, the terms "front" and "rear", specifying the positions of the parts in relation to each other refer to the normal travel direction of the turbo engine when operated in the air.

Thus, the fact that the support ring accommodates the blade feet helps not only to reduce the hub-to-tip ratio but to equally reduce the overall external dimensions of the rotor compared to prior art documents.

Moreover, the fact that the rotor is secured by at least one complementary bearing located upstream of the first bearing at the centre of the "pin" of sorts that it forms around the blade pitch changing and control system, helps to radially secure the rotor.

According to a feature of the invention, the tubular part has a second bearing arranged radially between the shaft and tubular part, the first and second bearings being arranged upstream and downstream of the blades, respectively.

Preferably, the tubular part extends such that it carries at least one complementary bearing for guiding the shaft ahead of the blades so that the rotor is firmly secured radially along its full length around components of the variable-pitch changing and control system.

This helps to limit the clearance in frame passage bearings between fixed parts and rotating parts for variable-pitch changing and control, located in the annular space. This helps to reduce the sizing constraints of the variable-pitch changing and control system.

Due to the fact that it involves bearings on the central shaft, the rotor holder has a low impact on the moment of inertia of the rotor.

Another aspect of this configuration is that it limits the clearance at the tip of the fan blades. More especially, this configuration helps to obtain blades with free ends that flush substantially with the fan casing.

The diameter of the said at least one complementary bearing may be smaller than that of the first bearing. Generally, the latter is used to axially hold the rotor, while the complementary bearing can only help to secure it radially.

Advantageously, the tubular part is mounted on a fixed part that equally carries the said first bearing.

Preferably, the blade pitch changing and control system comprises a pitch changing system connected to the fan rotor through a pitch changing device mounted on the stationary casing and equipped with a translatably moveable control part following the rotation axis of the rotor, and a load transfer bearing between the control part and blade pitch changing and control system.

The control means comprises an actuator arranged to drive the moveable control part. The actuator, which is generally an actuating cylinder, is mounted on the stationary casing.

Advantageously, the tubular part serves as a fixed path guiding the axial movement of the control part.

Preferably, the load transfer bearing is located behind the blades.

The load transfer bearing between the fixed and the rotating frames is thus closer to the casing, thereby limiting the lever arm and the clearance between the rotating parts and the fixed parts.

The control means may comprise a housing forming a chamber in which a piston slides, thereby driving the control part, with the said housing mounted on the supporting fixed part of the first bearing.

The piston drives an annular part that extends axially in front of the housing.

Most suitable for a fan rotor located ahead of the turbo engine, this configuration limits the overall external dimensions of the pitch changing and control system through the control means mounted inside the rotor.

Advantageously, the tubular part carries elastic return means arranged to exert an axial restoring force on the control part towards a given position, which preferably places the blades in a feathered position.

According to known means, the arrangement of the pitch changing mechanism helps to transform an axial translation movement of a part in the moving frames of the rotor into a rotation of blades around their pitch axis. The load transfer bearing links the axial translations of the control part in the fixed mark of the turbo engine to that of the said part of the changing mechanism of the rotor. Since the elastic return means exert their force in between two non-rotating parts, they themselves remain static, thereby limiting the rotating mass. Additionally, since they do not employ inertias effects, their restoring force is not directly proportionate to their mass.

Advantageously, the axial return means comprise at least two springs, each arranged such that when it exerts its restoring force, it is placed in compression in between the axial stop linked to the control part blocking a first axial end of the spring and another axial stop connected to the tubular part carrying the return means blocking the second axial end of the spring.

Preferably, the tubular part supporting the return means comprises at least an axial stop arranged to block the first axial end of each spring when the control part is axially located after the middle position relative to the restoring direction of the spring.

Preferably but without limitation, the fan module is arranged upstream of the turbo engine.

BRIEF DESCRIPTION OF DRAWINGS

This invention will be better understood and other details, specifications and advantages of same will come out more clearly after reading the following description with reference to the appended drawings on which.

DESCRIPTION OF AN EMBODIMENT OF THE INVENTION

Figure 1:
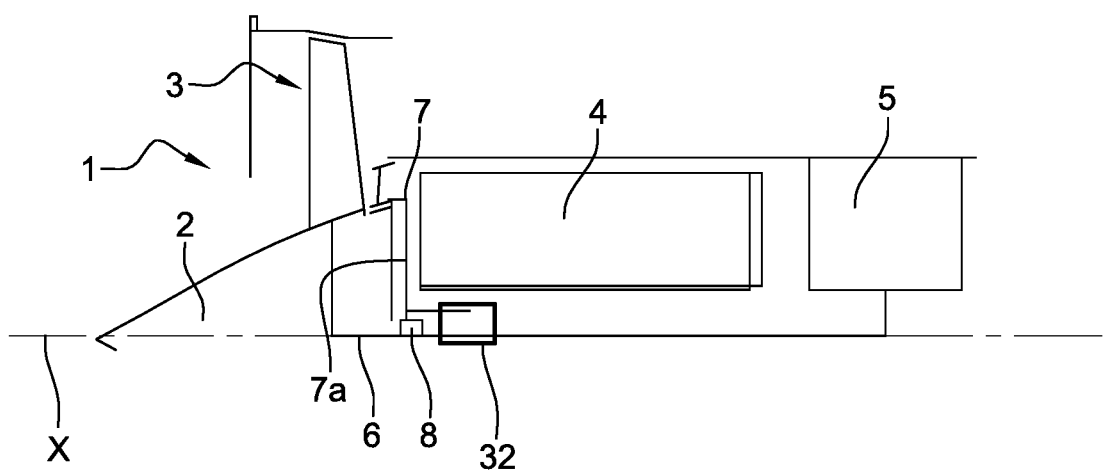
FIG. 1 is a schematic diagram of a turbo engine using the invention.

For instance, the invention relates to a turbo engine such as the one schematically illustrated on FIG. 1. It has a fan 1 comprising a rotor 2 that carries a series of blades 3. The fan 1 is generally ducted. Here, the fan 1 is placed in front of the engine section of the turbo engine which comprises successively a gas generator 4 and a power turbine 5 that drives the shaft 6 of the rotor 2 of the fan. Here, the fan 1 rotates around an X axis, which is equally the rotation axis of the engine section components and is generally located in front of the stationary casing 7 enclosing the engine section. The shaft 6 of the rotor runs across the stationary casing 7 and is axially secured through the latter by a bearing 8. The shaft 6 is also rotationally driven by a shaft connected to the power turbine (not illustrated) through a reducer 32.

The rotor 2 is located in front of a stationary casing 7 of the turbo engine. Preferably, the bearing 8 is arranged to secure the shaft 6 both radially and axially. For this reason, preference is given to ball bearings. Here, the bearing 8 is also mounted on a supporting part 7a of the casing 7, near the reducer 32. In other words, the bearing is mounted between the supporting part 7a of the casing 7 and the shaft 6 downstream of a blade pitch changing system.

Figure 2:
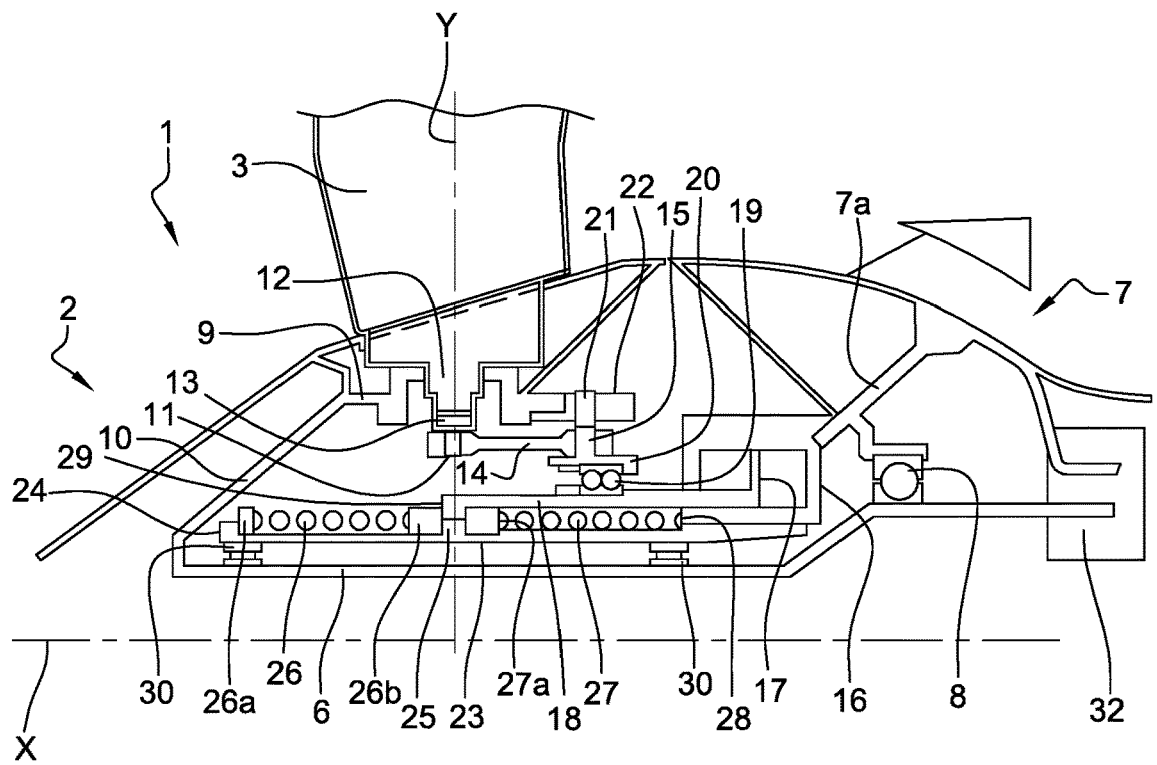
FIG. 2 is a schematic axial cross-section view of a first embodiment of a rotor blade pitch changing device according to the invention, with blades placed in a feathered position.

According to a first embodiment with reference to FIG. 2 in this configuration, the rotor 2 also comprises a support ring 9 for the blades 3, located ahead of the bearing 8. The front of the support ring 9 is linked to the front of the rotor 2 by a substantially truncated part 10 and the assembly is configured such that there is free interior space in front of the bearing 8, between the support ring 9 and the shaft 6. The ring 9 is radially located as close as possible to the shaft 6.

As illustrated on FIG. 2, a blade 3 is moveably mounted on the support ring 9 rotating around a substantially radial Y axis, by means of a rolling bearing, for instance (not illustrated). The blade 3 comprises a shaft 12 forming the blade foot centred on the Y axis, which projects radially beyond the support ring 9 in the free interior space. This shaft 12 allows the blade to rotate. As clearly illustrated, the ring 9 accommodates the blade foot shafts 12.

Figure 3:
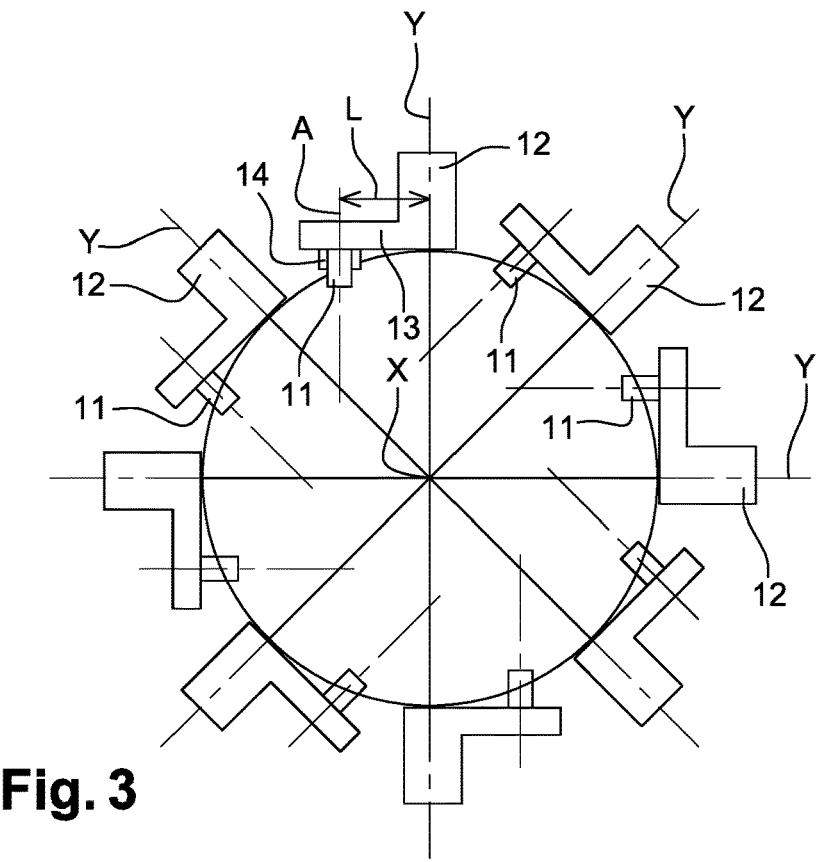
FIG. 3 is a schematic front view of the blade pitch angle control rods for a device according to the invention.

With reference to FIGS. 2 and 3, a crank 13 secured to the shaft 12 of the blade 3 foot is arranged in a manner substantially perpendicular to the blade in a plane transverse to the X axis of the rotor 2. Mechanical linkage including a substantially axial connecting rod 14 is also pivotally mounted on a pin 11 on point A of the crank 13 in a direction substantially parallel to the Y axis of the pivot shaft 12. The end of the pivot shaft 12, the crank 13 and the pin 11 may combine to form a blade rotating arm.

One can thus understand that there is no intermediate radial shaft running through this ring to connect the blades to the changing and control device. The foot shaft 12 does not run through the annular space and as such, it does not affect the radial space and the hub-to-tip ratio.

One can also notice on FIG. 2 that the length of the foot shaft 12 is less than the width of the annular space.

By so doing, an axial translation of the link rod 14 exerts a lever arm of a length L, equal to the distance between the connection point A and the Y axis of the pivot shaft 12, thereby causing the blade to rotate around the Y axis. The example on FIG. 3 illustrates eight shafts 12 for the fan blades, evenly distributed on the circumference of the ring 9. The crank 13 may extend in the space separating the two respective pivot shafts 12 to produce the lever arm L.

Here, the link rod 14 also extends backwards and comprises on its rear end, a head with an opening in which a pin 15 is inserted to push it forward or pull it backwards. Depending on the axial position of the pin 15, the angle of each blade 3 may vary around a mean position representing the feathered position, to end up either in a thrust position or a reverse thrust position.

The device is completed by an axial cylinder used to axially move the pins 15 passing through the heads of the link rods 14. The axial cylinder comprises a housing 16 attached to the casing 7 and placed in the free interior space of the rotor 2. The housing 16 creates a chamber in which a piston 17 can move, driving an annular part 18 that extends axially in front of the housing 16. Advantageously, the housing 16 and the piston 17 are equally annular around the X axis of the rotor 2. The position of the piston 17 is obtained an oil pressure difference on either side of the piston 17 inside the chamber of the housing 16, which is controlled by a control circuit not illustrated on the Figure. As in the prior art described previously, the control circuit is known to have servo means used to adjust the oil pressure entering the cylinder to obtain a specific movement of the piston 17. However, it should be noted that unlike this prior art, there is no need to introduce a dynamic seal into the oil system since the housing 16 of the cylinder is secured on the casing 7.

The annular part 18 driven by the piston 17 carries the inner race of a load transfer bearing 19, thereby allowing a ring 20 connected to the fan rotor 2 to rotate around the said part 18. The outer race of the bearing 19 secured on the said ring 20 like the inner race is attached to an annular part 18. By so doing, the axial movement of the annular part axially drives the ring 20, while allowing it to rotate with the rotor 2.

The ring 20 equally supports the pins 15 arranged to fit into the heads of the link rods 14, thereby enabling them to move axially. In this manner, the movement of the piston 17 of the cylinder is transferred to the link rods 14, thereby causing each blade 3 to rotate around its Y pitch axis.

Preferably, the ring 20 also has at least a stem 21 that protrudes radially into an axial slide guide 22 connected to the ring 9 supporting the blades 3. This helps to set the azimuthal position of the ring 20 relative to the rotor 2 by sharing the circumferential stress between the rotor 2 and the ring 20 without interfering with the displacement mechanism of the link rods 14.

A fixed and substantially tubular annular race 23 around which the moveable annular part 18 slides is equally attached to the inner radial periphery of the housing 16 and extends axially forward, along the shaft 6 of the rotor. The axial forward extension of this fixed annular race 23 is longer than that of the moveable annular part 18 driven by the piston. Preferably, the fixed annular race 23 runs across the Y pitch axis of the blades 3, extending substantially up to the connection point between the shaft 6 and the truncated part 10, without touching them.

The fixed annular race 23 comprises a first flange 24 projecting radially from is outer periphery to its front end and a second flange 25 also projecting radially from its outer periphery, substantially midway between the front radial wall 28 of the chamber 16 and the first flange. A first helical spring 26 is mounted around the outer periphery of the fixed annular race 23. This spring is arranged between the first flange 24 and the second flange 25. It has stops at both ends 26a, 26b, which help to hold it between the flanges 24, 25. A second helical spring 27 is mounted around the outer periphery of the fixed annular race 23, in between the second flange 25 and the front wall 28 of the housing 16 of the cylinder, thereby forming an axial stop on the fixed annular race 23. The second spring 27 also has a stop on its front end, the rear stop being made up of the front wall 28 of the housing 16. The second spring is radially located between the fixed annular race 23 and the moveable annular part 18.

The moveable annular part 18 driven by the piston 17 is designed to slide axially between the said springs 26, 27 without touching them. However, on its front end, the annular part 18 has a flange 29 that projects radially inwards, such that it pushes axially on the stop of the rear end 26b of the first spring 26 and the stop of the front end 27a of the second spring 27. On FIG. 2, the moveable annular part 18 lies in a middle position where its end flange 29 fits in between the rear stop of the first spring 26 and the front stop of the second spring 27, above the second flange 25 of the fixed annular part 18. To avoid flapping of the blades during feathering in case the cylinder fails, the flanges 25 and 29 must have the same thickness, with machining allowances close to each other.

A radial overlap is obtained between the feathering system and the blade pitch movement transformation system, while space is created to increase the diameter of the cylinder if necessary.

The module also has at least one complementary bearing 30 for guiding the shaft. In the example illustrated, the module has two complementary bearings 30 used to secure the rotor on the shaft 6 in the annular race 23. Small rolling bearings, i.e. with a lower radius than the bearing 8, help to create a smaller space. The space available for the cylinder is optimised by placing the bearings 30 and the device controlling the blade pitch movement transformation and the return to a feathered position in top of one another.

It is obvious that if a static cylinder is used, especially a non-hydraulic one, to actuate the axial movement of a moveable annular part 18 for a blade pitch changing and control system that is similar to the one described previously and that one is not necessarily bound by an obligation to install a return system, one can still use this configuration to mount a fixed annular race 23 to support to the bearings. Depending on the actuator system used, the fixed annular race 23 may be attached to a housing containing the actuator and secured on a structural part 7a that holds the first bearing 8, or be composed of the housing itself if it extends sufficiently ahead of the first bearing 8.

One can equally notice that the heads of the link rods 14 are behind the shaft 12 of the blades 3. Their length is such that when the moveable annular part 18 is in the middle position described earlier, with its front stop 29 substantially facing the second stop 25 of the fixed annular race 23, the ring is in a position close to the housing 16 of the cylinder, while allowing it to move backwards. This middle position of the ring 20 helps to ensure the rigidity of the assembly.

Moreover, in the example on FIG. 3, the fixed annular race 23 is connected to the shaft 6 of the rotor by one or more central complementary bearings 30 arranged lengthwise. The rotor 2 comprising the shaft 6, the conical connecting piece 10 and the support ring 9 form a pin of sorts that is fits into the annular race 23 and encloses the stator composed of the fixed actuator. The substantially tubular shape of the annular race 23 helps to keep it rigid.

The pin formed by the rotor 2 is held inwards along the shaft 6, by the bearing 8 near the reducer 32 and by central bearings 30 along the annular race 23. In other words, the bearings 30 are arranged radially between the shaft 6 and the fixed annular race 23, and axially upstream of the bearing 8. More particularly, a first central bearing 30 is arranged upstream of the blades and a second central bearing 30 arranged downstream of the blades. This arrangement enhances the transverse retention of the rotor 2 by spreading the stress lengthwise on the fixed annular race 23, from the first central bearing 30 arranges on the casing at the level of the hydraulic cylinder chamber right up to the second central bearing 30 located, on the example, just next to the front of the pin of the rotor 2.

Even more particularly, the outer race of the bearings 30 is carried by an annular race 23, while the inner race is carried by the shaft 6.

Here, it should be noted that unlike the first bearing 8, the central bearings 30 have a smaller diameter than the first bearing 8. Actually, these bearings 30 do not need to provide an axial support and offer the advantage of having smaller anti-friction bearings. They may be formed by roller bearings, which prevent an axial overstress on the rotor 2.

With the central bearings 30 holding the rotor, outer bearings holding the rotor can be fitted through the stationary casing 7 on the periphery of the bearing 8. This configuration helps to minimise the structural mass, especially the structural rotating mass of the rotor that holds it in place.

By securing the rotor 2 on its shaft 6, space is freed up outside the ring 9. By so doing, a larger radius can be given to the blade support ring 9. Additionally, stiffening the connection between the cylinder and the rotor 2 through the central bearings 30 helps to limit the clearance in the bearing 19 transferring load to the control ring 20 of the link rods 14.

Stiffening the assembly and providing space to increase the diameter of the support ring 9 helps to space out the link rods 14 on the X axis of the rotor 2. As illustrated on FIG. 3, the available distance between two pivot shafts 12 for a given angular spacing is proportionate to the radius at which the link rods 14 appear at the base of the pivot shaft 12. It is thus possible to either increase the number of blades 3 on the fan 1, or with a constant number of blades 3, increase the lever arm L, thereby lowering the sizing requirements of the hydraulic cylinder and its control circuit.

Figure 4:
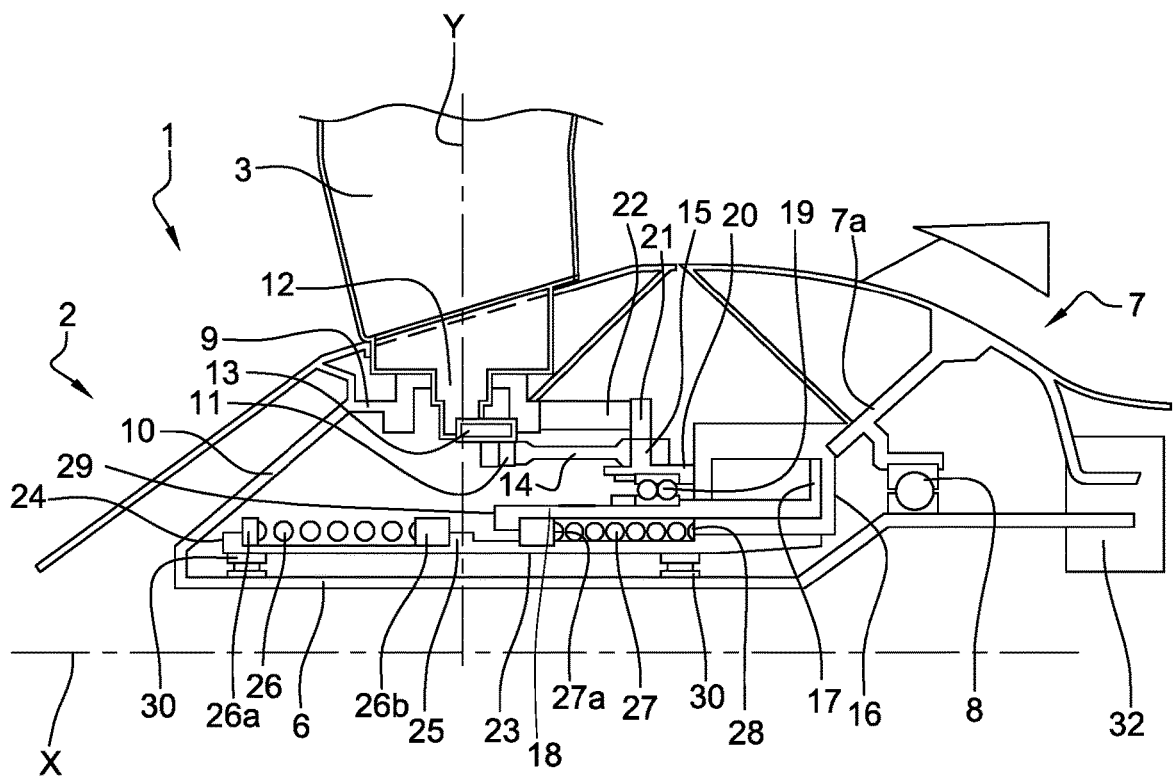
FIG. 4 is a schematic axial cross-section view of the first embodiment representing FIG. 3 with blades in propelling position.

The blade 3 pitch changing and control system thus described operates in the following manner:

With reference to FIG. 4, when the cylinder piston 17 moves backwards, it causes the blades 3 to rotate such that their pitch is in propulsion mode. The front stop 29 of the moveable annular part 18 compresses the second spring 27 against the stop formed by the front wall of the housing 16, while the first spring 26 remains trapped in between the first flange 24 and the second flange 25 of the fixed annular race 23, without interacting with the moveable annular part 18. In case of a failure in the hydraulic control system and the cylinder happens to break down, the restoring force exerted by the second spring 27 pushes the moveable annular part 18 forward up to the middle position shown on FIG. 3, where its front flange 29 faces the second flange 25 of the fixed annular race 23, with both springs 26 and 27 having their ends 26b and 27a in abutment on the said second flange 25. The middle position of the moveable annular part 18 having been designed to fit with the blade 3 angle in feathering position, the system performs its safety role when the fan 1 is in propulsion mode.

Figure 5:
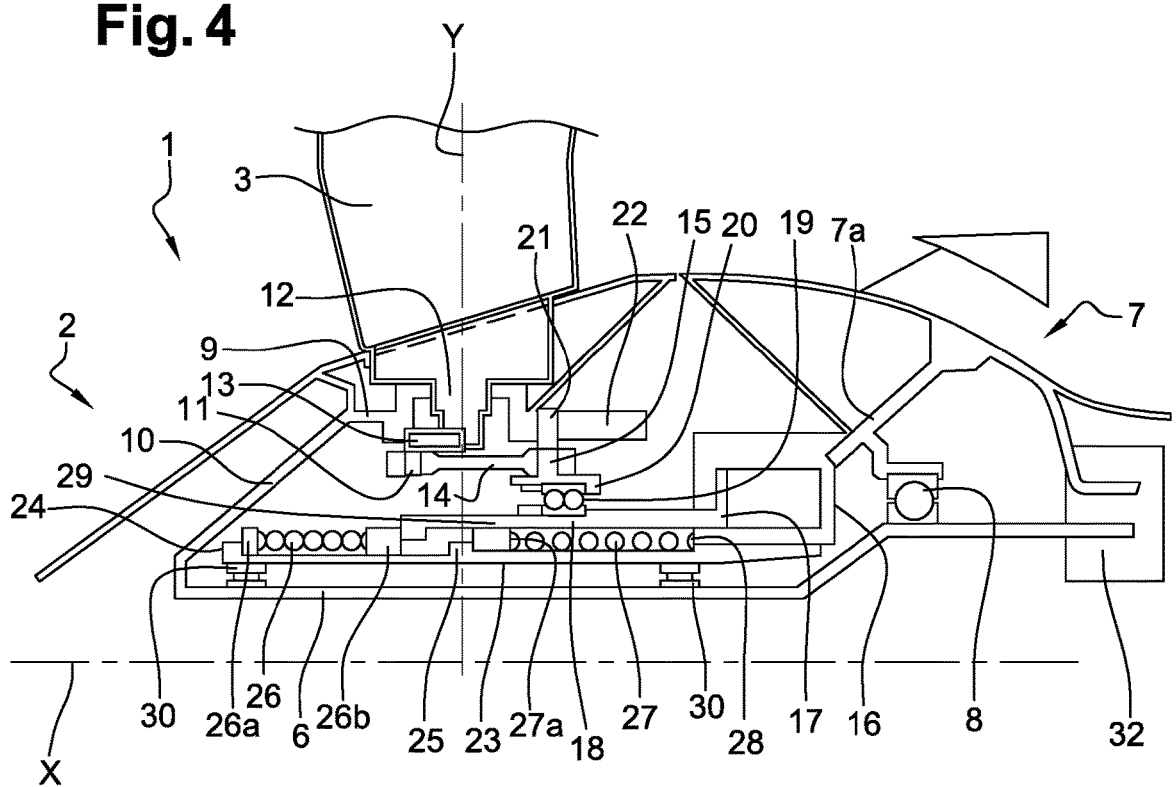
FIG. 5 is a schematic axial cross-section view of the first embodiment representing FIG. 3 with blades in reverse thrust position.

Symmetrically, with reference to FIG. 5, when the cylinder piston 17 moves forward, it causes the blades 3 to rotate such that their pitch is in reverse thrust mode. Moreover, the front stop 29 of the moveable annular part 18 compresses the first spring 26 against the first stop 24 of the fixed annular race 23, while the second spring 27 remains trapped in between the second flange 25 of the fixed annular race 23 and the front transverse wall of the housing 16, without interacting with the moveable annular part 18. In case of a failure in the hydraulic control system and the cylinder happens to break down, the restoring force exerted by the first spring 26 pushes the moveable annular part 18 backwards to the middle position shown on FIG. 3, where its front flange 29 faces the second flange 25 of the fixed annular race 23, with both springs 26 and 27 having their ends 26b and 27a in abutment on the said second flange 25.

By so doing, the system equally performs its safety role when the fan 1 is in reverse thrust mode.

In both situations, one can notice that the springs 26 and 27 normally return the moveable part 18 to a single and the same neutral position, namely the feathering position.

Meanwhile, each spring 26 and 27 act independently of each other according to the operation mode. The two springs can therefore be designed differently to optimise their restoring forces and tailor the blade 3 feathering movements to the propulsion mode on the one hand, and the reverse thrust mode on the other hand. More especially, they must be more robust than the aerodynamic stresses exerted on the fan blades 3.

Figure 6:
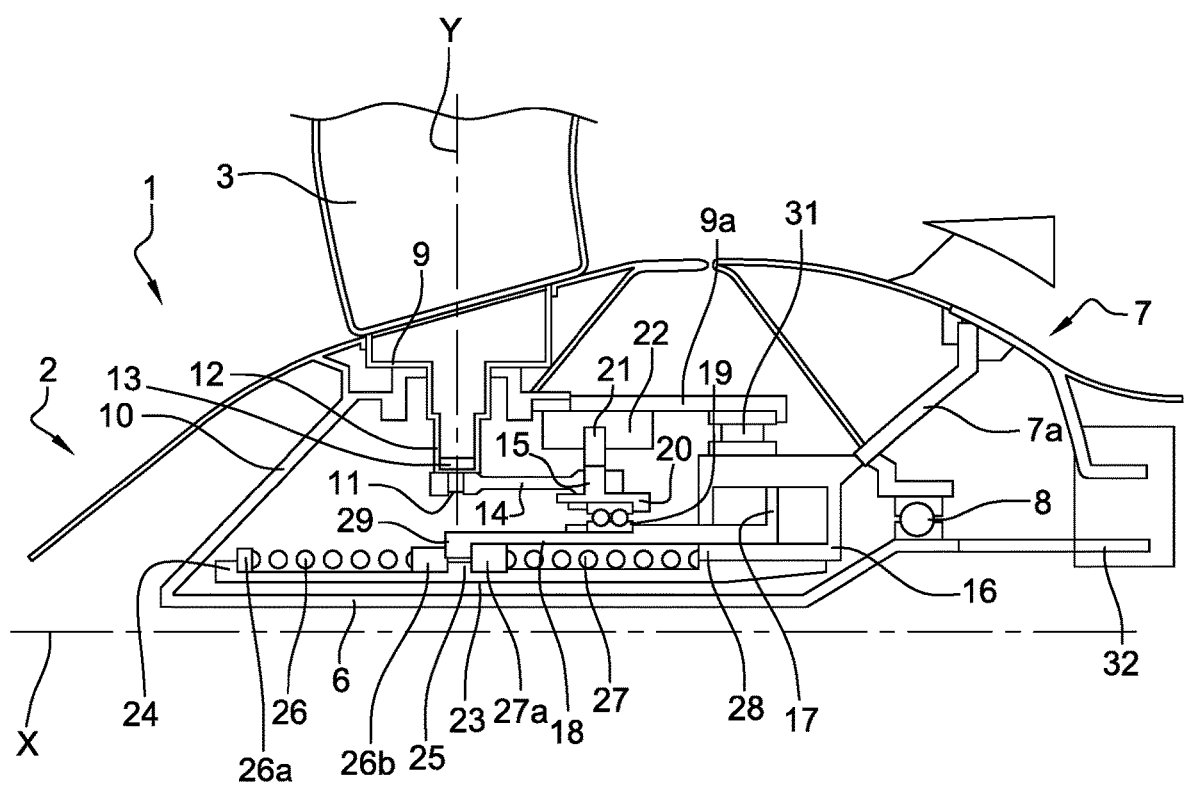
FIG. 6 is a schematic axial cross-section view of a second embodiment of a rotor blade pitch changing device according to the invention, with blades placed in a feathered position.

In a second embodiment, with reference to FIG. 6, the cylinder housing 16 is used, which housing is attached secured in front of the first retention bearing 8 of the rotor 2 on the part 7a of the stationary casing 7. Preferably, the housing 16 has an annular shape, especially its outer radial wall. A rear race 9b of the blades support ring 9 is arranged such that it is connected to the outer radial wall of the hydraulic cylinder housing 16 by a bearing 31 that enables it to rotate around the said wall.

The bearing 31 is mounted inversely relative to the bearing 8: the rotor 2 carrying the outer race of the bearing 31, whereas it carries the inner race of the bearing 8 on the shaft 6.

Here, the rotor 2, comprising the shaft 6, the conical connecting piece 10 and the support ring 9 together with the rear race 9a, for a pin of sorts that fits into the annular race 23 and encloses the stator composed of the fixed actuator up to the cylinder chamber 16, on the part 7a.

In this configuration, the rotor 2 is thus fully connected by its rear end to the stationary casing 7, by two inverted bearings connected to the same fixed structural part 7a. As previously indicated, the axial locking function being performed by the first bearing 8 on the shaft 6, the second bearing 31, with its larger diameter, secures the transverse rotation of the rotor 2. Preferably, it is composed of roller bearings to avoid creating any axial overstress.

With this solution, the fan 1 is held by a bearing 31 with a larger diameter than in the second embodiment, thereby allowing for more rigidity. The latter point helps to avoid undermining the proper operation of the fan by eliminating resonance modes in unspooled condition vibrations.

This embodiment offers an alternative to the first embodiment that secures the rotor 2 in a rigid position. By using the cylinder housing 16 to support a second bearing 31 to maintain the rotor 2, the structural body 7a of the casing 7 already in place is capitalised to secure the first bearing 8. In the process, the mass of the system is equally minimised and the rigidity achieved allows for a larger diameter of the rotor 2.

In another version of the invention (not illustrated), it is possible to secure the fan rotor using one or more bearings connecting a flange that extends axially towards the rear of the support ring 9 to a part of the stationary casing 7. By so doing, the fan 1 may rotate relative to the casing 7 with no need for the bearings described in the previous embodiments in tandem with the variable-pitch and feathering system. The fan is secured transversely and axially by the bearing 8 on the shaft of the rotor 6 and the other bearings that are more spaced out relative to the X rotation axis.

The invention claimed is:

1. A ducted fan module for a turbo engine, comprising:
   a rotor carrying a plurality of variable-pitch blades;
   a fan casing surrounding said plurality of variable-pitch blades;

a stationary casing; and a pitch changing and control device comprising blade mechanical linkage connected to the rotor, the pitch changing and control device being configured to adjust and control a setting of the plurality of variable-pitch blades, wherein the rotor comprises a central shaft and a blade support ring surrounding the central shaft, a front end of the blade support ring connected to a front end of the central shaft so as to create a rearward opening annular space between the blade support ring and the central shaft, the rearward opening annular space being configured to house the pitch changing and control device, and the central shaft being guided by a first bearing mounted in the stationary casing behind the blade support ring, wherein the blade support ring accommodates a plurality of shafts, each shaft of the plurality of shafts forming a foot of one blade of the plurality of variable-pitch blades, wherein a tubular part is connected to the stationary casing and extends into the rearward B opening annular space in front of the first bearing, the tubular part carrying a first complementary bearing for guiding the central shaft, and whereby the tubular part carries a second complementary bearing for guiding the central shaft, and wherein the second complementary bearing is arranged radially between the central shaft and the tubular part, with the first and second complementary bearings arranged in front of and behind, respectively, of the plurality of variable-pitch blades.

2. The ducted fan module according to claim 1, whereby the first and second complementary bearings for guiding the central shaft have a smaller diameter than the first bearing.

3. The ducted fan module according to claim 1, whereby the tubular part is connected to a fixed part of the stationary casing through a control housing of the pitch changing and control device, wherein the fixed part carries the first bearing.

4. The ducted fan module according to claim 1, whereby the pitch changing and control device is provided with a translatably moveable annular part configured to move axially along the rotation axis of the rotor, and a load transfer bearing between the translatably moveable annular part and the blade mechanical linkage.

5. The ducted fan module according to claim 4, wherein the tubular part serves as a stationary race that guides axial movement of the translatably moveable annular part.

6. The ducted fan module according to claim 4, whereby the load transfer bearing is located behind the plurality of variable-pitch blades.

7. The ducted fan module according to claim 4, whereby the pitch changing and control device comprises a control housing that creates a chamber in which a piston slides thereby driving the translatably moveable annular part, the control housing mounted on a fixed part of the stationary casing.

8. The ducted fan module according to claim 4, wherein the tubular part carries springs exerting an axial restoring force on the translatably moveable annular part to move the translatably moveable annular part to a given position.

9. The ducted fan module according to claim 8, whereby the springs comprise a first spring and a second spring, each of the first and second springs being arranged to exert the axial restoring force and each of the first and second springs comprising a first axial end and a second axial end, wherein the first spring is compressed between a first axial stop connected to the translatably moveable annular part, thereby locking the first axial end of the first spring, and a second axial stop connected to the tubular part, thereby locking the second axial end of the first spring, wherein the second spring is compressed between the first axial stop, thereby locking the first axial end of the second spring, and a third axial stop connected to the tubular part, thereby locking the second axial end of the second spring.

10. The ducted fan module according to claim 9, whereby the tubular part comprises a fourth axial stop arranged to:

lock the first axial end of the first spring when the translatably moveable annular part is axially located beyond a middle position thereof away from the first spring, and lock the first axial end of the second spring when the translatably moveable annular part is axially located beyond the middle position thereof away from the second spring.

11. A ducted fan module for a turbo engine, comprising:
a rotor carrying a plurality of variable-pitch blades;
a fan casing surrounding said plurality of variable-pitch blades;
a stationary casing; and
a pitch changing and control device configured to adjust and control a setting of the plurality of variable-pitch blades, wherein the rotor comprises a central shaft and a blade support ring surrounding the central shaft, a front end of the blade support ring connected to a front end of the central shaft so as to create a rearward opening annular space between the blade support ring and the central shaft, the rearward opening annular space being configured to house the pitch changing and control device, and the central shaft being guided by a first bearing mounted in the stationary casing behind the blade support ring, wherein the blade support ring accommodates a plurality of shafts, each shaft of the plurality of shafts forming a foot of one blade of the plurality of variable-pitch blades, wherein a tubular part is connected to the stationary casing and extends into the rearward opening annular space in front of the first bearing, the tubular part carrying at least a first complementary bearing for guiding the central shaft, whereby the pitch changing and control device comprises blade mechanical linkage connected to the rotor, the pitch changing and control device being mounted on the stationary casing and provided with a translatably moveable annular part configured to move axially along a rotation axis of the rotor, and a load transfer bearing between the translatably moveable annular part and the blade mechanical linkage, wherein the tubular part carries axial return members exerting an axial restoring force to move the translatably moveable annular part to a given position, whereby the axial return members comprise a first spring and a second spring, each of the first and second springs being arranged to exert the axial restoring force and each of the first and second springs comprising a first axial end and a second axial end, wherein the first spring is compressed between a first axial stop connected to the translatably moveable annular part, thereby locking the first axial end of the first spring, and a second axial stop connected to the tubular part, thereby locking the second axial end of the first spring, wherein the second spring is compressed between the first axial stop, thereby locking the first axial end of the second spring, and a third axial stop connected to the tubular part, thereby locking the second axial end of the second spring.

* * * * *